(12) United States Patent
Kang et al.

(10) Patent No.: US 11,269,954 B2
(45) Date of Patent: Mar. 8, 2022

(54) DATA SEARCHING METHOD OF DATABASE, APPARATUS AND COMPUTER PROGRAM FOR THE SAME

(71) Applicant: Bitnine Co., LTD., Seoul (KR)

(72) Inventors: Cheolsun Kang, Incheon (KR); Kisung Kim, Seoul (KR); Junseok Yang, Jeonju (KR); Hyeongtae Lim, Incheon (KR); Gitae Yun, Seoul (KR)

(73) Assignee: BITNINE CO., LTD., Seoul (KR)

( * ) Notice: Subject to any disclaimer, the term of this patent is extended or adjusted under 35 U.S.C. 154(b) by 469 days.

(21) Appl. No.: 15/423,271

(22) Filed: Feb. 2, 2017

(65) Prior Publication Data

US 2017/0228468 A1 Aug. 10, 2017

(30) Foreign Application Priority Data

Feb. 5, 2016 (KR) .................. 10-2016-0015309

(51) Int. Cl.
*G06F 16/80* (2019.01)
*G06F 16/22* (2019.01)
*G06F 16/2455* (2019.01)
*G06F 16/901* (2019.01)

(52) U.S. Cl.
CPC .......... *G06F 16/80* (2019.01); *G06F 16/2282* (2019.01); *G06F 16/2455* (2019.01); *G06F 16/9024* (2019.01)

(58) Field of Classification Search
CPC ............... G06F 17/30958; G06F 16/80; G06F 16/2282; G06F 16/2455; G06F 16/9024
USPC ...................................................... 707/769
See application file for complete search history.

(56) References Cited

U.S. PATENT DOCUMENTS

| 9,104,665 | B1 * | 8/2015 | Bik ................ G06F 17/30958 |
| 2005/0182975 | A1 * | 8/2005 | Guo ..................... H04L 12/12 |
| | | | 713/300 |
| 2013/0103693 | A1 * | 4/2013 | Arikuma .......... G06F 17/30014 |
| | | | 707/741 |
| 2015/0026158 | A1 * | 1/2015 | Jin ................... G06F 17/30958 |
| | | | 707/722 |
| 2015/0278396 | A1 * | 10/2015 | Vasilyeva ......... G06F 17/30958 |
| | | | 707/769 |
| 2016/0342708 | A1 * | 11/2016 | Fokoue-Nkoutche ................... |
| | | | G06F 17/30958 |

FOREIGN PATENT DOCUMENTS

| EP | 2570936 A1 | 3/2013 |
| JP | 2000305953 A | 11/2000 |

* cited by examiner

*Primary Examiner* — Baoquoc N To
(74) *Attorney, Agent, or Firm* — Patent Office of Dr. Chung Park

(57) ABSTRACT

The present invention provides a data searching method of database, apparatus and computer program for the same. The data searching apparatus of a database includes: a storage unit configured to store graph data; and a controller configured to store physical location information in which vertex and edge information included in the graph data is stored in the storage unit, and perform a search for the vertex and the edge based on the physical location information. Thereby, it is possible to efficiently search the data by improving a search speed of a graph, minimize the update of the information even when a storage location of the data is changed, and facilitate query by the graph data regardless of types of the database and a storage structure, and efficiently use a storage space.

8 Claims, 4 Drawing Sheets

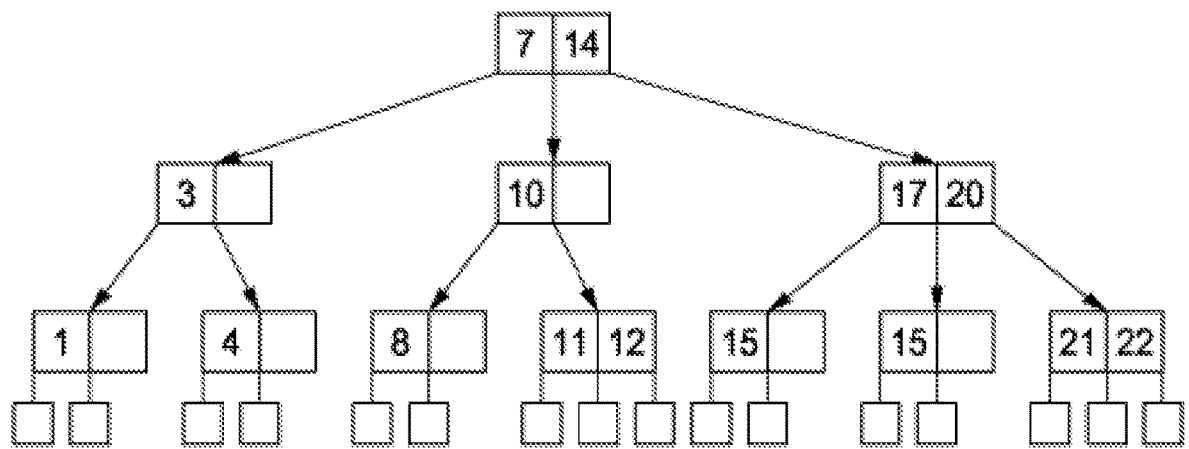
FIG. 1
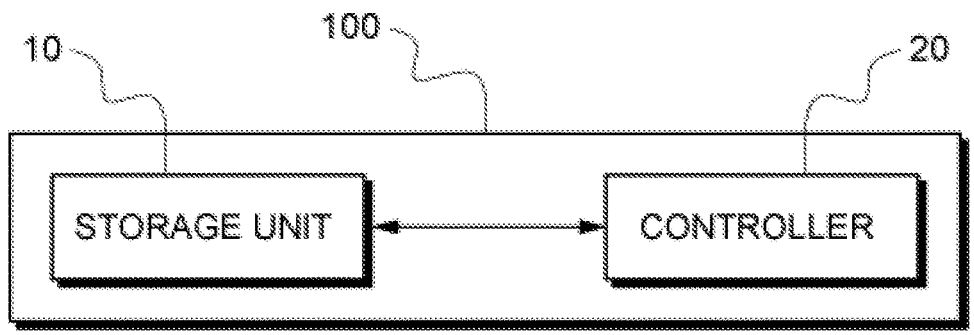
FIG. 2
| ID |
|---|
|  |
|  |
| ID | Start Vertex | End Vertex |
|---|---|---|
|  |  |  |
|  |  |  |
FIG. 3A

| ID | Vertex ID | Key | Value |
|----|-----------|-----|-------|
|    |           |     |       |
|    |           |     |       |

| ID | Vertex ID | Key | Value |
|----|-----------|-----|-------|
|    |           |     |       |
|    |           |     |       |

FIG. 3B

| ID | Properties |
|----|------------|
|    |            |
|    |            |

| ID | Start Vertex | End Vertex | Properties |
|----|--------------|------------|------------|
|    |              |            |            |
|    |              |            |            |

FIG. 4

DATA SEARCHING METHOD OF DATABASE, APPARATUS AND COMPUTER PROGRAM FOR THE SAME

RELATED APPLICATIONS

This application claims priority to Korean Patent Application No. 10-2016-0015309, filed on Feb. 5, 2016 in the Korean Intellectual Property Office, the entire disclosure of which is incorporated herein by reference.

BACKGROUND OF THE INVENTION

1. Field of the Invention

The present invention relates to a data searching method of database, apparatus and computer program for the same. More particularly, the present invention relates to a data searching method of database, apparatus and computer program for the same for searching data in the database by a graph data structure.

2. Description of the Related Art

A database stores and processes input data, and outputs a result corresponding to a query input by a user. Particularly, when a capacity of the input data is large, various types of databases are used in a data processing apparatus for processing data to increase a processing rate and obtain a reliable result.

Among the databases, a graph database is optimized to process semi-structured data that do not observe a structured data model rule connected to a relational database or different types of data table, thereby being applied to various fields such as social data, recommendation, geographic spatial analysis, and the like. In a case of the graph data used in the graph database, there is an advantage in that information on a connectional relationship between data may be stored and analyzed to mine new information.

Among operations applied to the graph data, the most basic and important operation is an operation for a graph search. The graph search refers to a search for various vertices included in the graph data according to connection information of a graph, and for this, rapidly finding other vertices connected to one vertex is the key.

In an operation used for the above-described graph search in a conventional database, a B-tree index, a join algorithm, and the like are used. The B-tree index includes a root index which is an uppermost level, a branch index below the root index, and a leaf index which is a lowermost level, as illustrated in FIG. 1. Herein, the root index and the branch index indicate index blocks of a next level, and each index block stores a header, an ID, and a length and a value of a key column and is bidirectionally connected for facilitating index search.

However, the conventional algorithm for the above-described graph search has a problem in that as a size of data is increased, a search efficiency is decreased. As an example, in the case of the B-tree index, when n items are indexed, a size of a B tree is increased to O (log N), and a search speed is in proportion to a height of the B tree. Herein, in the B tree, since each node of the tree is stored in a disk, read I/O of the disk occurs once for a single search, such that large costs are required.

As a prior art, Korean Patent Registration Publication No. 10-1480670 discloses a method for searching the shortest path in a big graph database, however, did not solve the above-described problems.

SUMMARY OF THE INVENTION

Accordingly, it is an object of the present invention to provide a data searching method of database, apparatus and computer program for the same capable of efficiently searching data by improving a search speed of a graph.

In addition, another object of the present invention is to provide a data searching method of database, apparatus and computer program for the same capable of minimizing update of information even when a storage location of the data is changed.

Further, another object of the present invention is to provide a data searching method of database, apparatus and computer program for the same capable of facilitating query by graph data regardless of types of the database and a storage structure, and efficiently using a storage space.

In order to accomplish the above objects, there is provided data searching apparatus of a database, including: a storage unit configured to store graph data; and a controller configured to store physical location information in which vertex and edge information included in the graph data is stored in the storage unit, and perform a search for the vertex and the edge based on the physical location information.

Herein, a table which stores the graph data may include a vertex table configured to store the vertical information and the physical location information corresponding to the vertex information, and an edge table configured to store the edge information and the physical location information corresponding to the edge information.

The vertex table may include a vertex property table configured to store properties of the vertex, and the edge table may include an edge property table configured to store properties of the edge.

The table may store data by a JavaScript object notation (JSON) data type.

The vertex table may store physical location information on an edge that enters a specific vertex and physical location information on an edge that leaves the specific vertex, in a list form.

Further, when a row is added due to update of the database or the row is dispersed such that physical location movement occurs, the controller may update the physical location information in a chain form so that the physical location information points the added row.

The controller may update the physical location information in response to at least one of deletion of the vertex information, addition of the edge information, update of the edge information, and deletion of the edge information.

The storage unit may additionally store a global index for searching for an actual storage location of the graph data, and the controller may postpone an update timing of the physical location information until a timing in which it is determined by the global index that the physical location information does not point accurate vertex and/or edge information.

In addition, according to another aspect of the present invention, there is provided a data searching method of a database, including: storing, by a controller, graph data in a storage unit; storing, by the controller, physical location information in which vertex and edge information included in the graph data is stored in the storage unit; and performing, by the controller, a search for the vertex and the edge based on the physical location information.

Herein, the data searching method of a database may further include: updating, by the controller, the physical location information in response to at least one of deletion of the vertex information, addition of the edge information, update of the edge information, and deletion of the edge information.

The data searching method of a database may further include: additionally storing, by the storage unit, a global index for searching for an actual storage location of the graph data by a control of the controller; and postponing, by the controller, an update timing of the physical location information until a timing in which it is determined by the global index that the physical location information does not point accurate vertex and/or edge information.

Further, according to another aspect of the present invention, there is provided a computer program which is executed by a computer in a data searching apparatus of a database for data searching of the database, the computer program including: storing, by a controller, graph data in a storage unit; storing, by the controller, physical location information in which vertex and edge information included in the graph data is stored in the storage unit; and performing, by the controller, a search for the vertex and the edge based on the physical location information.

In accordance with the data searching method of a database, the apparatus and the computer program for the same according to the present invention, it is possible to efficiently search the data by improving a search speed of a graph.

In addition, in accordance with the data searching method of a database, the apparatus and the computer program for the same according to the present invention, it is possible to minimize the update of the information even when a storage location of the data is changed.

Further, in accordance with the data searching method of a database, the apparatus and the computer program for the same according to the present invention, it is possible to facilitate query by the graph data regardless of types of the database and a storage structure, and efficiently use a storage space.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram for describing a process of performing graph search in a conventional database;

FIG. 2 is a block diagram illustrating a configuration of a data searching apparatus of a database according to an embodiment of the present invention;

FIGS. 3A and 3B are diagrams illustrating structures of tables used in the database according to the embodiment of the present invention;

FIG. 4 is a diagram illustrating structures of tables used in a database according to another embodiment of the present invention;

DETAILED DESCRIPTION OF THE INVENTION

Figure 5:
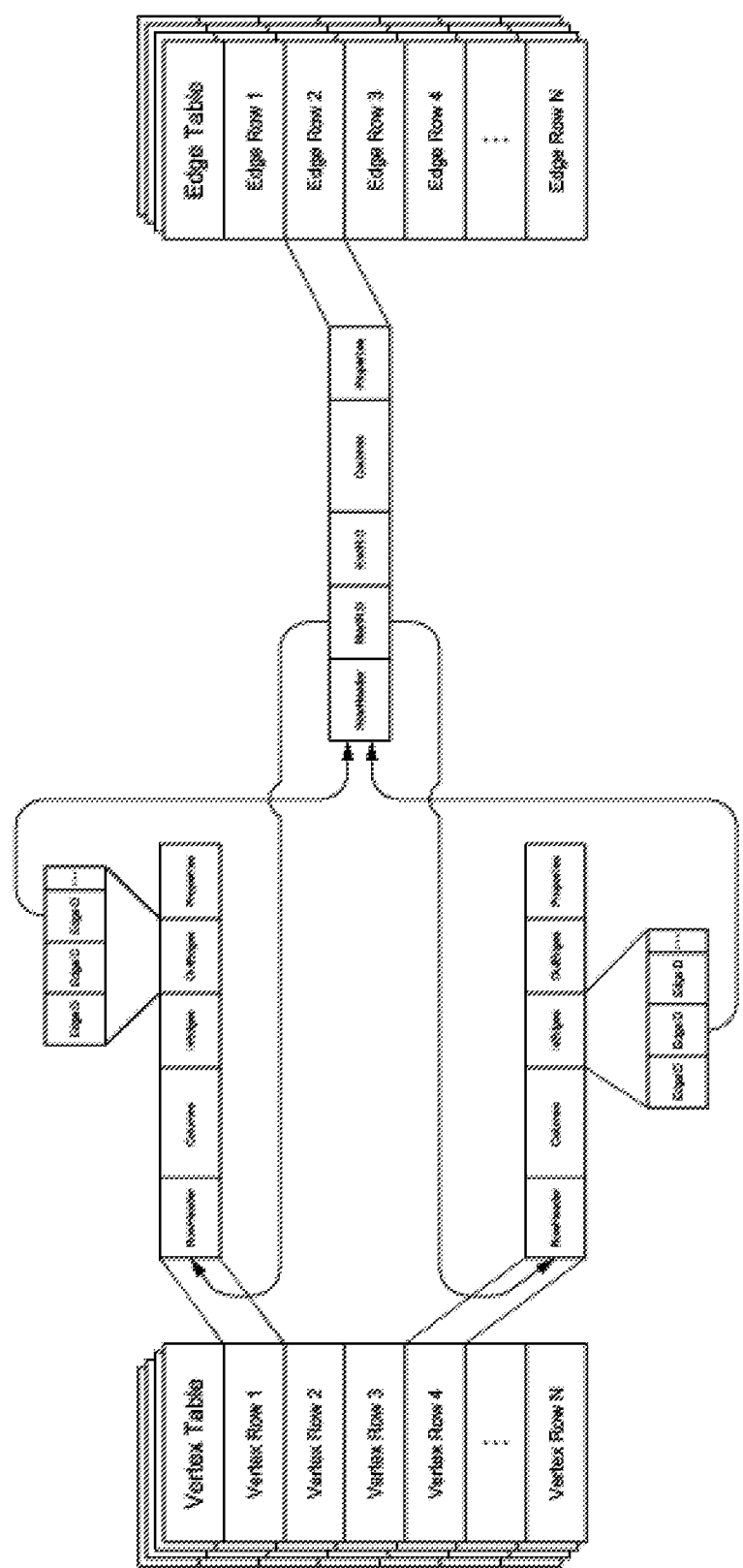
FIG. 5 is a diagram illustrating a data storage structure used in the database according to the embodiment of the present invention.

Hereinafter, a data searching method of database, apparatus and computer program for the same according to the present invention will be described in detail with reference to the accompanying drawings.

FIG. 2 is a block diagram illustrating a configuration of a data searching apparatus of a database according to an embodiment of the present invention. As illustrated in FIG. 2, the data searching apparatus 100 of a database according to the embodiment of the present invention includes a storage unit 10 and a controller 20. The database accessed by the data searching apparatus 100 according to the present invention may include various types of databases such as a NoSQL database as well as a relational database. In a case of the relational database, data is stored in the storage unit 10 in a block structure having a fixed size, and in a case of the NoSQL database, although a structure of storing the data in the storage unit 10 varies depending on types of the database, any database may be applied so long as it is a database in which the vertex and the edge are stored as one data value and it may identify a physical storage location of the stored data, regardless of types of the structure, and the NoSQL database may be implemented as a part of a database management system (DBMS) or a separate apparatus.

The storage unit 10 stores the data. The storage unit 10 according to the present invention may be implemented as a storage medium such as a hard disk or a solid state drive (SSD) in which the data may be input and output (I/O), and various storage media capable of storing the data and identifiable physical location information for the data.

The controller 20 stores the physical location information in which vertex and edge information included in the data is stored in the storage unit 10, and performs a search for the vertex and the edge based on the stored location information. The controller 20 according to the embodiment of the present invention may be implemented as a microcomputer and software for driving the microcomputer, software that may be embedded in the database, or the like.

Specifically, the controller 20 according to the present invention may store the physical location information for searching for edge information of the vertex and vertex information of the edge in a pointer form, in addition to direct vertex and edge information, instead of a tree structure for searching for the vertex and the edge, etc. Thereby, information on an edge connected to a specific vertex and information on a vertex connected by a specific edge may be rapidly searched in a state in which the vertex and edge information is stored in the storage unit 10.

FIGS. 3A and 3B are diagrams illustrating structures of tables used in the database according to the embodiment of the present invention.

When the database storing the data is a relational database, one graph includes a vertex, an edge, properties of the vertex, and properties of the edge. In order to store the above-described four entities, each of the entities is mapped to a separate table to create a table for storing the vertex, a table for storing the edge, a table for storing the properties of the vertex, and a table for storing the properties of the edge.

Meanwhile, when the database storing the data is a NoSQL database, since it is not forced to have the same type of the data, there is no predetermined schema, and the database has only a key-value structure of the properties. Therefore, as illustrated in FIG. 3B, the properties are not stored in the vertex table and the edge table, but are separately stored in a vertex property table and an edge property table.

FIG. 4 is a diagram illustrating structures of tables used in a database according to another embodiment of the present invention. In a case of the latest relational database, a JavaScript object notation (JSON) data type for storing schema-free data is provided. When using the JSON data type, the property table may not be separately maintained, thus as illustrated in FIG. 4, the property item may be stored together in the vertex table and the edge table.

The data searching apparatus of a database according to the present invention stores physical location information in a pointer form for searching an edge having a specific vertex as a start vertex or an end vertex, or searching a start vertex or an end vertex for a specific edge, together with vertex and edge information in order to increase a search speed of a graph stored in the storage unit 10. The data storage structure including the above-described location information in a pointer form is as illustrated in FIG. 5.

Specifically, the graph data stored in the storage unit 10 according to the present invention includes the vertex table for storing the vertex information and the edge table for storing the edge information. As illustrated in FIG. 5, the vertex information stored in the vertex table includes InEdges and OutEdges, which respectively store physical location information (i.e. pointer information) on an edge that enters the corresponding vertex and physical location information on an edge that leaves the corresponding vertex, in a list form. In other words, the InEdges and the OutEdges store physical locations in which the connected edges are stored in a list form.

Further, the edge information stored in the edge table includes StartRID storing a physical location in which the start vertex of the corresponding edge is stored, and EndRID storing a physical location in which the end vertex of the corresponding edge is stored.

That is, since the data searching apparatus of a database according to the present invention records the physical storage location of the vertex or the edge, it is possible to improve the search speed of the graph, as compared the conventional data searching method in which the B-tree or the join algorithm needs to be used at the time of searching the data since an ID which is a logical value, or the like is stored. Further, since there is no need to update a physical location information list when adding a vertex and updating the properties of the vertex and the edge, it is possible to minimize an update of information even when the storage location of the data is changed, while improving the search speed of the graph.

On the other hand, the data searching apparatus of a database according to the present invention needs to update an edge list in the start vertex and the end vertex data when an edge is added, and when intending to update the start vertex (StartVertex) and the end vertex (EndVertex) of the edge, needs to update physical location information of a vertex of the edge.

Further, when deleting the vertex, an edge pointing the corresponding vertex needs to be updated, and when deleting the edge, a vertex pointing the corresponding edge needs to be updated.

That is, the data searching apparatus of a database according to the present invention updates the physical location information only when the connection information of the edge is changed and when the storage locations of the vertex and the edge are changed. However, in order to decrease costs for such the update, in the present invention, a global index for searching for an actual storage location of the graph data is additionally stored in the storage unit 10, and the controller 20 postpones an update timing of the pointer information until a timing in which it is determined by the global index that a pointer does not point accurate vertex and/or edge information, thereby minimizing the costs for the update.

Particularly, in a case of a cluster database, information for pointing a location of a row in the table includes a file ID, a block ID, an offset in the block ID, and a cluster node ID. The cluster database adds or deletes a node to and from a cluster for expandability. When a node is added, data is dispersed even to a new node to uniformly distribute the data over the entire nodes. Thus, in this case, it is preferable to postpone an update timing of the physical location information.

Further, in a case of database performing an out-place update in which a new row is created in each update of the row for managing a version of the row such as PostgreSQL, etc., since the physical location of the row is changed when updating the row, management is performed in such a manner that a row originally pointed by the pointer points a newly created row like a change form, such that it is possible to find the newly updated row by using the existing pointer. In this case, a process of periodically inspecting an unnecessary old version row to recover a space and preventing loss of information of a chain during the recovering process, is required.

A process of searching the graph data using the physical location information according to the present invention will be described as follows. A query in a graph database may be performed by using a graph search API such as TinkerPop API, etc., or by a method of performing a graph pattern query such as Cypher, etc. For example, a code called g.V( ).out("knows").values("name") that may be used in the graph search API is a code for obtaining a value of a "name" property of a vertex connected by an edge to a vertex having the edge of a label called "knows" as an out-going edge among the vertices belonging to a graph (g). For performing the above process, first, an edge is searched from an edge table of the knows label, and a vertex pointed by EndVertex of the corresponding edge is read to extract the value of name property. Herein, in the present invention, since the EndVertex has the physical location information of the vertex, it is possible to improve the search speed. A basic operation of the graph pattern query is the same as that of the graph search API.

Similarly, a code called g.V( ).in("knows").values ("name") is capable of obtaining a value of a "name" property of a vertex connected by an edge to a vertex having the edge of a label called "knows" as an incoming edge among the vertices belonging to a graph (g), with respect to each vertex. In this case, a vertex pointed by StartVertex is read by searching an edge from the know edge table to extract the value of the name property.

Meanwhile, when intending to search a graph pattern through SQL, a query optimizer of the RDBMS performs a query including a relational operation for processing the corresponding SQL. In this case, since a join operation may be processed by using the pointer information that is the physical location information, a processing speed may be improved.

Figure 6:
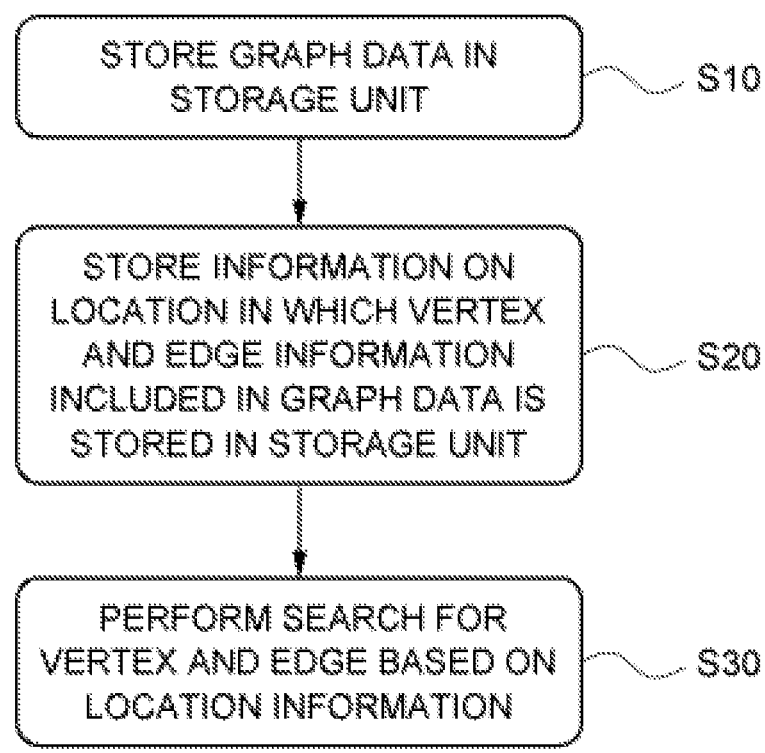
FIG. 6 is a flowchart illustrating a data searching method of a database according to the embodiment of the present invention.

Herein, a data searching method of a database according to the present invention will be described with reference to FIG. 6.

First, the controller 20 stores graph data in the storage unit 10 (S10). A table which stores the graph data stored in the storage unit 10 may include a vertex table configured to store vertex information and physical location information corresponding to the vertex information, and an edge table configured to store edge information and physical location information corresponding to the edge information. The table may also store data by the JavaScript object notation (JSON) data type.

Next, the controller 20 stores the physical location information in which the vertex and edge information included in the graph data is stored in the storage unit 10 (S20). Herein, the information on the physical location in which the vertex and edge information is stored refers to the pointer information for searching for edge information of the vertex and vertex information of the edge.

Lastly, the controller 20 performs a search for the vertex and the edge based on the physical location information stored in the storage unit 10 in step S20. In particular, the controller 20 may improve a search speed by updating the physical location information at the time of deletion of the vertex information, addition of the edge information, update of the edge information, and deletion of the edge information.

Thereby, in the present invention, storage locations of other vertices and edges accessing a vertex row and an edge row at the time of the graph search are stored in adjacent vertex and edge, such that information on an edge connected to a specific vertex and information on a vertex connected by a specific edge may be rapidly searched. Further, since the pointer information is updated only when the connection information of the edge is changed and when the storage locations of the vertex and the edge are changed, it is possible to reduce costs.

Herein, the data searching method of a database according to the present invention may further include, when a row is added due to update of the database or the row is dispersed such that physical location movement occurs, updating, by the controller 20, location information in a chain form so that the physical location information points the added row.

Further, a data searching method according to another embodiment of the present invention may further include additionally storing, by the storage unit 10, a global index for searching for an actual storage location of the graph data, and postponing, by the controller 20, an update timing of the physical location information until a timing in which it is determined by the global index that the physical location information does not point accurate vertex and/or edge information.

Although the present invention has been described with reference to the embodiments shown in the drawings, but these are merely an example. It should be understood by persons having common knowledge in the technical field to which the present invention pertains that various modifications and modifications of the embodiments may be made. And, such modifications are included in the technical protection scope of the present invention. Accordingly, the real technical protection scope of the present invention is determined by the technical spirit of the appended claims.

DESCRIPTION OF REFERENCE NUMERALS a. 10: storage unit, 20: controller
b. 100: data searching apparatus

What is claimed is:

1. A data searching apparatus of a database, comprising:
a storage unit configured to store graph data thererin; and
a controller comprising a microcomputer and configured to store physical location information in which vertex and edge information included in the graph data is stored in the storage unit, and perform a search for the vertex and the edge based on the physical location information,
wherein the controller updates the physical location information in response to at least one of deletion of the vertex information, addition of the edge information, update of the edge information, and deletion of the edge information,
wherein the storage unit additionally stores a global index for searching for an actual storage location of the graph data, and
wherein the controller postpones an update timing of the physical location information until a timing in which it is determined by the global index that the physical location information does not point accurate vertex and/or edge information.

2. A data searching apparatus of a database, comprising:
a storage unit configured to store a table therein, wherein the table stores graph data therein; and
a controller comprising a computer and configured to store physical location information in which vertex and edge information included in the graph data is stored in the storage unit, and perform a search for the vertex and the edge based on the physical location information,
wherein the table includes a vertex table configured to store the vertex information and the physical location information corresponding to the vertex information, and an edge table configured to store the edge information and the physical location information corresponding to the edge information, and
wherein the vertex table stores physical location information on an edge that enters a specific vertex and physical location information on an edge that leaves the specific vertex, in a list form.

3. The data searching apparatus of a database according to claim 2, wherein the vertex table includes a vertex property table configured to store properties of the vertex, and
the edge table includes an edge property table configured to store properties of the edge.

4. The data searching apparatus of a database according to claim 2, wherein the table stores data by a JavaScript object notation (JSON) data type.

5. The data searching apparatus of a database according to claim 2, wherein, when a row is added due to update of the database or the row is dispersed such that physical location movement occurs, the controller updates the physical location information in a chain form so that the physical location information points the added row.

6. The data searching apparatus of a database according to claim 2, wherein the controller updates the physical location information in response to at least one of deletion of the vertex information, addition of the edge information, update of the edge information, and deletion of the edge information.

7. A method for searching data in a database by a controller comprising a computer, the method comprising:
storing, by the controller, graph data in a storage unit;
storing, by the controller, physical location information in which vertex and edge information included in the graph data is stored in the storage unit;
performing, by the controller, a search for the vertex and the edge based on the physical location information;
updating, by the controller, the physical location information in response to at least one of deletion of the vertex information, addition of the edge information, update of the edge information, and deletion of the edge information;
additionally storing, by the controller, a global index for searching for an actual storage location of the graph data by a control of the controller; and
postponing, by the controller, an update timing of the physical location information until it is determined by the global index that the physical location information does not point accurate vertex and/or edge information.

8. A non-transitory computer-readable recording medium or media comprising a set of instructions for searching data in a database, wherein execution of the set of instructions by one or more processors causes the one or more processors to perform the steps of:
- storing graph data in a storage unit;
- storing physical location information in which vertex and edge information included in the graph data is stored in the storage unit;
- performing a search for the vertex and the edge based on the physical location information;
- updating the physical location information in response to at least one of deletion of the vertex information, addition of the edge information, update of the edge information, and deletion of the edge information;
- additionally storing a global index for searching for an actual storage location of the graph data by a control of the controller; and
- postponing an update timing of the physical location information until it is determined by the global index that the physical location information does not point accurate vertex and/or edge information.

\* \* \* \* \*